(12) United States Patent  (10) Patent No.: US 6,658,856 B2
Critchley                  (45) Date of Patent:     Dec. 9, 2003

(54) HYBRID LEAN PREMIXING CATALYTIC COMBUSTION SYSTEM FOR GAS TURBINES

(75) Inventor: Ian L. Critchley, Phoenix, AZ (US)

(73) Assignee: Vericor Power Systems LLC, Alpharetta, GA (US)

( * ) Notice: Subject to any disclaimer, the term of this patent is extended or adjusted under 35 U.S.C. 154(b) by 0 days.

(21) Appl. No.: 10/052,976

(22) Filed: Jan. 17, 2002

(65) Prior Publication Data

US 2003/0134240 A1 Jul. 17, 2003

(51) Int. Cl.[7] .................................................. F02C 7/22
(52) U.S. Cl. .................. 60/777; 60/39.37; 60/723; 60/772; 60/794
(58) Field of Search .................. 60/39.37, 262, 60/723, 737, 772, 777, 794

(56) References Cited

U.S. PATENT DOCUMENTS

| 3,121,526 A | * | 2/1964 | Morley | 230/116 |
|---|---|---|---|---|
| 3,975,900 A | * | 8/1976 | Pfefferle | 60/39.23 |
| 4,040,252 A | | 8/1977 | Mosier et al. | |
| 4,285,193 A | * | 8/1981 | Shaw et al. | 60/723 |
| 4,517,802 A | * | 5/1985 | Kobayashi et al. | 60/606 |
| 5,165,224 A | | 11/1992 | Spadaccini et al. | |
| 5,412,938 A | | 5/1995 | Keller | |
| 5,623,819 A | | 4/1997 | Bowker et al. | |
| 5,937,632 A | | 8/1999 | Döbbeling et al. | |
| 6,098,396 A | * | 8/2000 | Wen et al. | 60/39.02 |
| 6,105,360 A | | 8/2000 | Willis | |

* cited by examiner

Primary Examiner—Charles G. Freay
Assistant Examiner—John F. Belena
(74) Attorney, Agent, or Firm—Thomas, Kayden, Horstemeyer & Risley, L.L.P.

(57) ABSTRACT

A system and method of combusting a hydrocarbon fuel is disclosed. The system combines the accuracy and controllability of an air staging system with the ultra-low emissions achieved by catalytic combustion systems without the need for a pre-heater. The result is a system and method that is mechanically simple and offers ultra-low emissions over a wide range of power levels, fuel properties and ambient operating conditions.

29 Claims, 5 Drawing Sheets

HYBRID LEAN PREMIXING CATALYTIC COMBUSTION SYSTEM FOR GAS TURBINES

GOVERNMENT RIGHTS

This invention was made with Government support under Contract No. DE-FC02-00CH11053 awarded by the US Department of Energy & Vericor, Fuel Flexible Ultralow Emissions Combustion System Program. The Government has certain rights in this invention.

BACKGROUND OF THE INVENTION

The present invention generally relates to a method and system for combusting hydrocarbon fuels with resulting ultra-low emissions over a wide range of power levels, fuel properties and ambient operating conditions.

The conventional gas turbine combustor, as used in a gas turbine power generating system, requires a mixture of fuel and air which is ignited and combusted uniformly. Generally, the fuel injected from a fuel nozzle into the inner tube of the combustor is mixed with air for combustion, fed under pressure from the air duct, ignited by a spark plug and combusted. The gas that results is lowered to a predetermined turbine inlet temperature by the addition of cooling air and dilutent air, then injected through a turbine nozzle into a gas turbine.

It is well known within the art that exhaust gases produced by combusting hydrocarbon fuels can contribute to atmospheric pollution. This occurrence is attributed to the development of localized high temperature zone, which can exceed 2,000° C. Exhaust gases typically contain many undesirable pollutants such as nitric oxide (NO) and nitrogen dioxide ($NO_2$), which are frequently grouped together as Nitrogen Oxides ($NO_x$), unburned hydrocarbons (UHC), carbon monoxide (CO), and particulates, primarily carbon soot.

Several methods are known in the art to decrease $NO_x$ emissions. For example, the formation of fuel-bound $NO_x$ can be minimized or avoided entirely by burning a low nitrogen or nitrogen-free fuel. However, burning a low nitrogen fuel does nothing to reduce the formation of thermal or prompt $NO_x$. The formation of thermal $NO_x$ can be reduced by operating under uniformly fuel-lean conditions, such as by using a lean diffusion flame or a lean premixed/prevaporized (LPP) system. The excess air used to achieve fuel-lean combustion acts as a diluent to lower flame temperatures, thereby reducing the amount of thermal $NO_x$ formed. Prompt $NO_x$ can also be reduced by operating under fuel-lean conditions. However, the extent to which thermal and prompt $NO_x$ formation can be reduced by fuel-lean combustion may be limited by flame instability that occurs at very lean conditions.

By way of example, Honeywell Air Staged Combustion Systems as used in the ASE120 and ASE50DLE industrial engines are air-staged lean, premixing (LP) combustion systems. Air from the compressor flows over the combustor wall to provide convective cooling and then to at least one three-way air staging valve. Depending on their position, these valves direct air either to the premixers, where the fuel is added and mixed prior to burning in the combustor, or to a bypass manifold which returns the air to the main gas stream downstream of the flame but upstream of the turbine. By modulating the air staging valves the flame temperature can be held substantially constant from no-load to peak conditions. At no-load conditions, a large amount of air is bypassed, while at high power a relatively small amount of air is bypassed allowing the flame temperature to be held close to the ideal for low emissions throughout the power range. An advantage of this system is that all of the compressed air is routed through the turbine, and there is no loss of efficiency as in bleed-type air staging systems. A further advantage is that the combustion system pressure drop remains substantially constant as the air staging valves are modulated. Thus there is little or no impact of the air staging system operation on overall engine efficiency. This provides a system that is accurate and controllable over a wide range of power levels, fuel properties and ambient operating conditions. However, it is not capable of achieving ultra-low emissions.

Catalytic combustion systems, though, are capable of achieving ultra-low emissions. Catalytic combustion systems using a solid phase catalyst are known within the art. However, Catalytic combustion systems are not able to offer the accuracy and controllability of the air staging system over a wide range of power levels, fuel properties and ambient operating conditions.

U.S. Pat. No. 4,040,252, issued to Mosier, a Catalytic Premixing Combustor, discloses a combustor arrangement for a power plant having a tandem, self-regulating arrangement wherein a combustion chamber for burning a fuel-air mixture is placed in line with a catalytic reaction device. This is a representative example of a combination fuel-air combustion chamber and catalytic reaction devices. While such devices are known within the art they are difficult to use, cumbersome, require a great deal of hardware, expensive, and generally require a pre-heater. Pre-heaters are cumbersome and expensive to supply and operate. However, if eliminated in such a systems the catalyst will not activate and this would result in extremely high HC or CO emissions, or the flame will be too lean to sustain. Therefore, a preheater is needed in prior art systems.

Accordingly, what is needed in the art is an easy to use, inexpensive method and system for combusting hydrocarbon fuels that is accurate, controllable, easily adapted to a wide range of power levels, fuel properties and ambient operating conditions, and offers ultra-low emissions without the need for a preheater.

SUMMARY OF THE INVENTION

The present invention is directed to an easy to use and inexpensive method and system for combusting hydrocarbon fuels over a wide range of power levels, fuel properties and ambient operating conditions that results in ultra-low emissions.

One aspect of the invention is a system for combusting hydrocarbon fuel, comprising an air supply for supplying air from a compressor to an air inlet, at least one air staging valve, at least one fuel preparation and mixing section for receiving fuel and air directed from the air staging valves, at least one catalyst section for receiving said fuel and air mixture, a combustor, a secondary air stream and an exit for delivering the exiting effluent gas stream generated by the system to a turbine.

The system may be operated in different manners to allow for low and high power operation, as well as according to a controlled schedule that may be programmed. Under low power operation oxidation does not occur in the catalyst section. However, the mixing of the fuel and air in the fuel preparation and mixing section is enhanced by the presence of the catalyst. As the engine power level increases the compressor outlet air temperature will become high enough to activate the catalyst, and partial oxidation reactions will occur.

In one aspect of the present invention, a method of combusting a hydrocarbon fuel is disclosed. According to this method, air is compressed, then divided into at least one air staging valve air stream and at least one secondary air stream. Each air staging valve air stream is divided into at least one bypass flow stream, and at least one primary air stream. The bypass flow stream flows through a bypass manifold, combines with the secondary air stream and the output is an output bypass flow stream. It should be noted that the secondary air stream may consist solely of the control air stream. For instance, at high power, where the temperature profile is important, the output bypass flow stream is low and therefore has little effect. The primary air stream is introduced into a fuel preparation and mixing section, wherein fuel is injected and mixed to form a fuel/air mixture stream, which is introduced into a catalyst section. During certain conditions, which vary, depending on the specific catalyst, no oxidation will occur, but premixing is enhanced by the presence of the catalysts. The product stream that exits the catalyst section is then fed into the combustor. The temperature and composition of the product stream are selected to control simultaneously the amounts of $NO_x$ formed in the combustor and the stability of the flame in the combustor, thereby controlling the total amount of $NO_x$ in the exit effluent gas stream. Where conditions are desired such that no oxidation occurs in the catalyst section, the air staging valve schedule may be set to yield a flame temperature around 1800 K.

In another aspect of the present invention, a method of combusting a hydrocarbon fuel is disclosed. According to this method, air is compressed, then divided into at least one air staging valve air stream and at least one secondary air stream. Each air staging valve air stream is divided into at least one bypass flow stream, and at least one primary air stream. The bypass flow stream flows through a bypass manifold, combines with the secondary air stream and the output is an output bypass flow stream. This may consist of solely the secondary air stream, or such a low bypass flow stream that it is negligible. Also the control air stream may consist solely of the secondary air stream. The primary air stream is introduced into a fuel preparation and mixing section, wherein fuel is injected and mixed to form a fuel/air mixture stream, which is introduced into a catalyst section, wherein the fuel/air mixture stream is partially oxidized creating a partial oxidation product stream. The partial oxidation product is combined with the control air stream to form an exit effluent gas stream, which exits to the turbine. The temperature and composition of the partial oxidation product stream are selected to control simultaneously the amounts of $NO_x$ formed in the combustor and the stability of the flame in the main combustor, thereby controlling the total amount of $NO_x$ in the exit effluent gas stream. Where partial oxidation is desired, the air staging valve schedule will be set to yield a flame temperature of around 1700 K.

According to one embodiment, a method of combusting hydrocarbon fuel is disclosed comprising compressing an air stream in a compressor, dividing the air stream into a first air staging valve air stream, a second air staging valve air stream and one secondary air stream, utilizing an air staging valve to controllably divide the first air staging valve air stream into one bypass flow stream and one primary air stream, introducing said bypass flow stream into a bypass manifold. The resulting output bypass flow stream is combined with other air streams and form the control air stream. The primary air stream is then introduced into a fuel preparation and mixing section, wherein fuel is injected and mixed to form a fuel/air mixture stream, which is then introduced into a catalyst section, wherein a catalyst is located and partially oxidizes the fuel by contacting the catalyst mixture with an oxidation catalyst in a catalytic oxidation stage, thereby generating a heat of reaction and a partial oxidation product stream comprising partially oxidized hydrocarbons, carbon monoxide and excess air. The partial oxidation product stream is combusted in a main combustor, at a condition at which appreciable quantities of thermal $NO_x$ are not formed, thereby generating an effluent gas stream. The temperature and composition of the partial oxidation product stream are selected to control simultaneously the amounts of $NO_x$ formed in the main combustor and the stability of the flame in the main combustor, thereby controlling the total amount of $NO_x$ in the exit effluent gas stream. The flame in the main combustor is controlled to a flame temperature between 1700 K and 2000 K by varying the position of the air staging valve. It should be understood by those skilled in the art that a number of different air streams may be combined in different ways in order to form the exit effluent gas stream. By way of example the bypass flow stream, secondary air stream and effluent gas stream may be combined to form an exit effluent gas stream. Also, the secondary air stream and bypass flow stream may be combined to form a control air stream which is then combined with the effluent gas stream to form an exit effluent gas stream.

It is envisioned that, in order to control the air valve schedule, the control system may be programmed to a predetermined schedule. Further, one embodiment is to provide closed loop control, wherein sensors will detect the temperature in the region of the catalyst exit, and provide a control signal to a controller that will adjust the air staging valve schedule to give the appropriate flame temperatures.

These and other features, aspects and advantages of the present invention will become better understood with reference to the following drawings, description and claims.

DETAILED DESCRIPTION OF THE INVENTION

The present invention generally relates to a method and system for combusting hydrocarbon fuels with resulting ultra-low emissions, over a wide range of power levels, fuel properties and ambient operating conditions. Known within the art is the use of an air staged combustion system in order to achieve a wide range of operating and ambient conditions. Also, air staged combustion systems provide a great deal of accuracy and controllability. However, air staged combustion systems have not heretofore been able to provide ultra-low emissions that are common with catalytic combustion systems.

Figure 1:
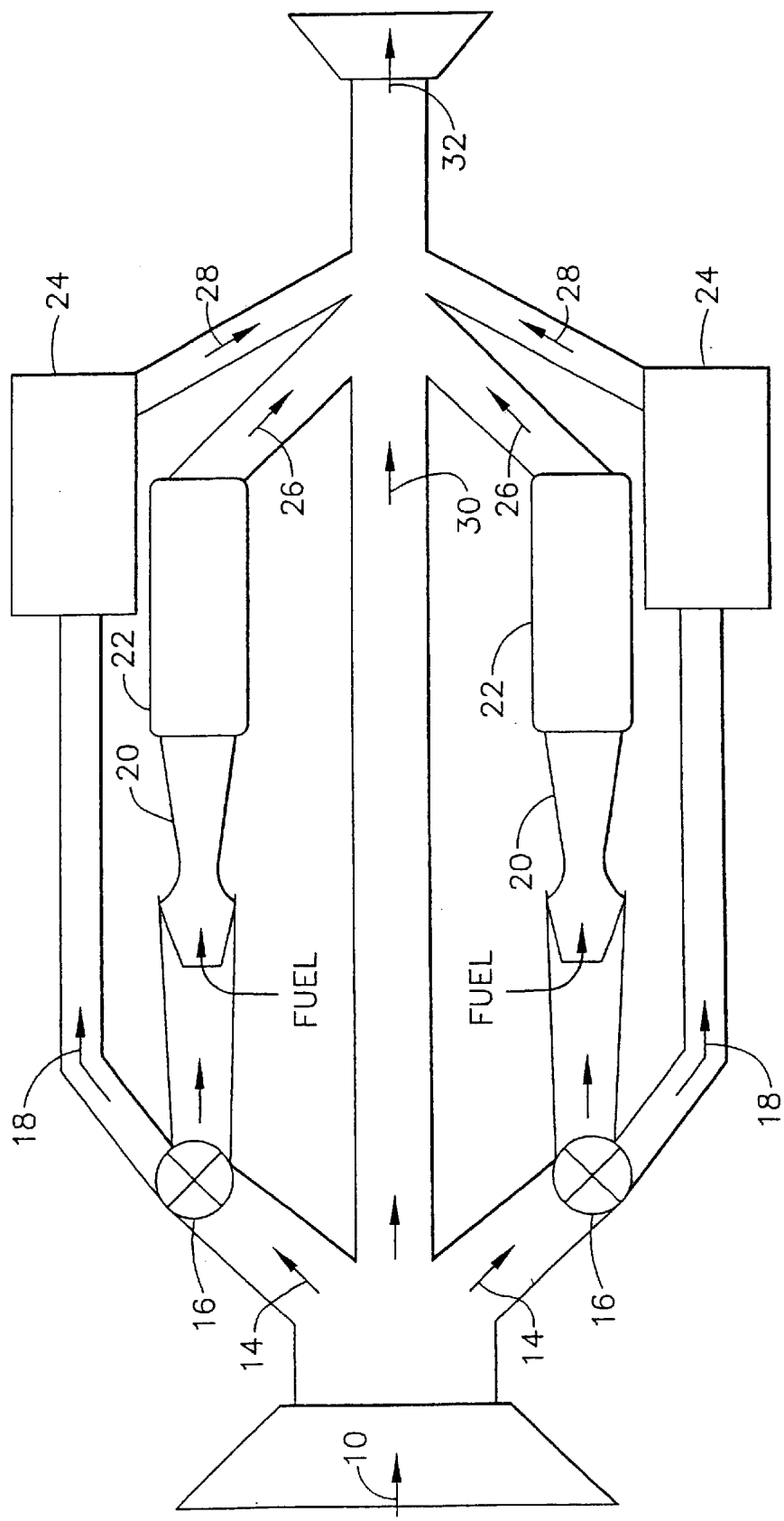
FIG. 1 is a schematic of an air-staged combustion system known within the art.

FIG. 1 depicts a schematic of an air-staged combustion system as is known within the art. As shown, air is compressed in a compressor, resulting in an air stream 10. The air stream is divided into a first air staging valve air stream 14 and a second air staging valve air stream 14. According to a preferred embodiment the first air staging valve air stream 14 and a second air staging valve air stream 14 are each controllably divided, by an air staging valve 16, into one bypass flow stream 18 and one air stream to be introduced into the premixers 20. The bypass flow stream 18 passes to a bypass manifold 24 and creates an output bypass flow stream 28. The air staging valves 16 are modulated in order to hold the flame temperature constant from no-load to peak load conditions. A closed loop control is used to position the air staging valves 16. The source of the signal to drive the control system may be an air pressure drop, a flame sensor or directly measured emissions. Fuel is added to the premixers 20, and the fuel and air are mixed. It should be noted that fuel throughout the present invention may refer to liquid or gaseous fuel. The function of the premixer is to mix the fuel and the air to a high degree of uniformity. The air staging valves provide control to achieve a stabilized flame, allow for easy protection from flashbacks, and individual tuning of the premixer air flow to compensate for small flow discrepancies in either the air or fuel.

The fuel air mixture is then introduced to the combustor 22, wherein the mixture is combusted. The combusted fuel/air mixture 26, air from the bypass manifold, bypass flow stream 28 and the secondary air stream 30 are combined and allowed to exit 32. The advantage of this system is that flame temperature may be maintained at any desired value for many different operating conditions. Although the flame temperature may be controlled to that ideal for low emissions, this lean premixing air staged system cannot achieve the ultra-low emissions possible with a catalyst system.

Figure 2:
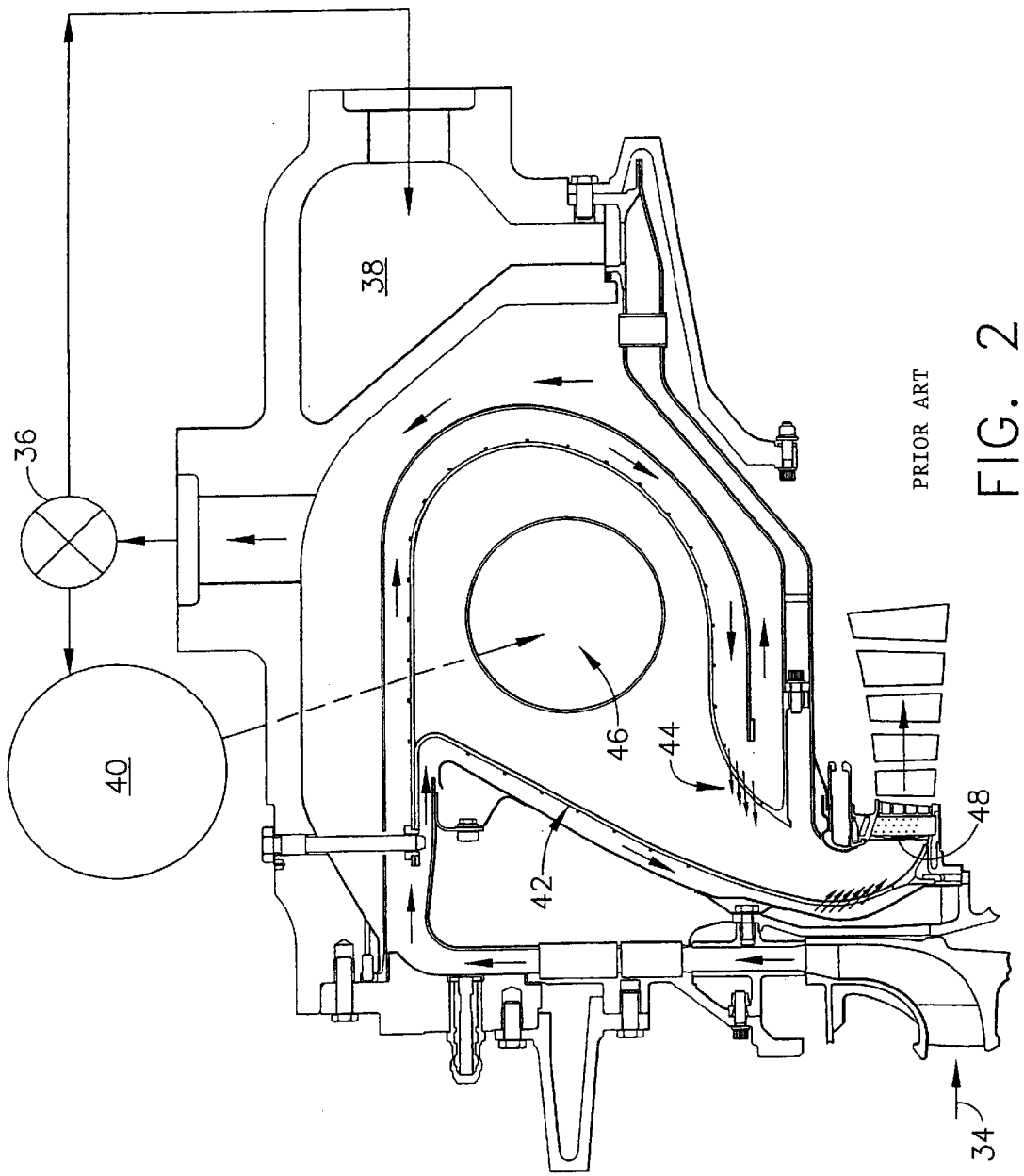
FIG. 2 is a cross-sectional view of a prior art air staged combustion system.

FIG. 2 depicts a cross-sectional view of the above described and previously known air staged combustion system. Air from a compressor enters entrance 34 flows over combustor wall to provide convective cooling, then to one or more three-way air staging valves 36. Depending on their position the air staging valves 36 direct air via a combustion air manifold 40 to either premixers exit 46, where the fuel is added and mixed prior to burning in the combustor, or to a bypass manifold 38 from which the air is injected downstream of the flame just upstream of the turbine. By modulating the air staging valves 36 the flame temperature can be held substantially constant from no-load to peak load conditions. In addition to the previously mentioned advantages of this prior art system, another advantage of this system is that all of the compressed air is routed through the turbine, and there is no loss of engine efficiency as in bleed-type air-staging systems. At no-load conditions, a large amount of air is bypassed, allowing the flame temperature to be held close to the ideal for low emissions. As the fuel flow increases for higher power settings, the amount of combustion air in the combustion air manifold 40 is increased, keeping the flame temperature constant. Fuel, either liquid or gaseous, is injected into and mixed in the premixers 46. The flame is stabilized in a downstream combustion chamber 42. Dilution air, not shown, is introduced into the combustion chamber 42 downstream of the flame to control the exit temperature profile, the bypass air is also injected in this area. Once the combustion process is complete, effusion wall cooling air 44 is introduced in the dilution section. In its lean, premixed form, the flame temperature is controlled to around 1800 K (2780° F.) by varying the position of the air valves. A closed loop control is used to position the air-staging valves 36. The source of the signal to drive the control system may be an air pressure drop, a flame sensor or directly measured emissions. The combination of an active control system with air staging offers the advantage that the flame temperature is maintained at any desired value at all operating conditions. The two premixers may be individually tuned to compensate for small flow discrepancies in either the air or fuel systems. The effluent gas stream created is delivered to the turbine inlet 48. This system allows for a wide range of operating and ambient conditions, providing accuracy and controllability. However, prior art air staging systems do not have the capability of achieving ultralow emissions. It is a purpose of the present invention to combine many of the positive attributes of an air staged combustion system with the ultralow emissions capability of a catalyst system, yet to accomplish these attributes without the need for cumbersome hardware, such as preheaters and premixers, that contribute to the overall emissions of the system and contribute complexity to the design and operation.

Figure 3:
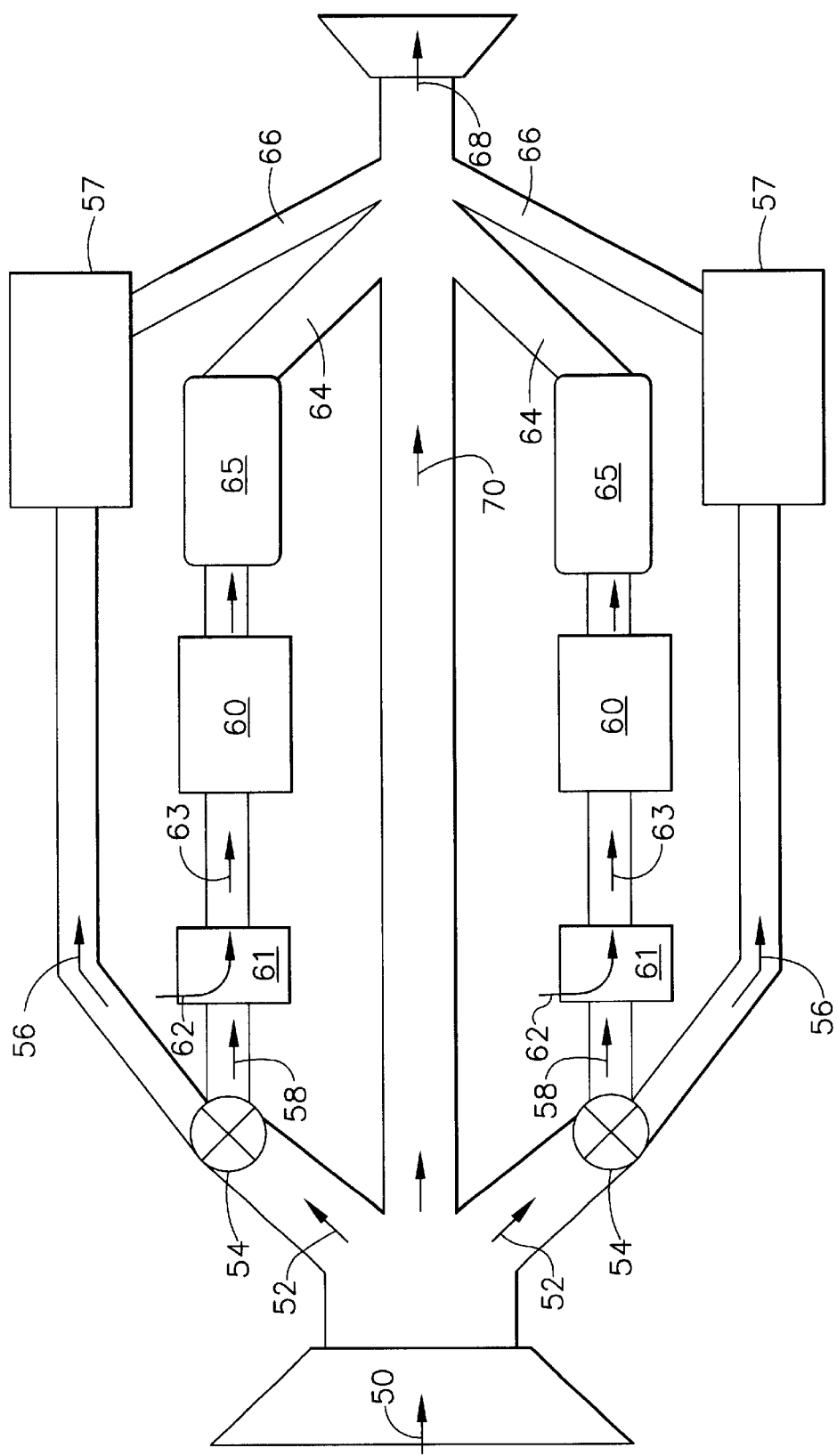
FIG. 3 is a schematic of the hybrid lean premixing catalytic combustion system for gas turbines according to the present invention.

One aspect of the present invention may be a system for combusting hydrocarbon fuel, comprising an air supply for supplying air from a compressor to an air inlet, at least one air staging valve, at least one fuel preparation and mixing section for receiving fuel and air directed from the air staging valves, at least one catalyst section for receiving said fuel and air mixture, a main combustor, a secondary air stream and an exit for delivering the exiting effluent gas stream generated by the system to a turbine. An embodiment of the present invention is depicted schematically in FIG. 3. As shown, air may be compressed in a compressor, resulting in an air stream 50. The air stream 50 may be divided into two air staging valve air streams 52. According to a preferred embodiment the air staging valve air streams 52 are each controllably divided by an air staging valve 54, into one bypass flow stream 56 and one primary air stream 58. The bypass flow stream 56 flows though the bypass manifold 57 and creates an output bypass flow stream 66. The primary air stream 58 may be introduced into a fuel preparation and mixing section 61, which is upstream from a catalyst section 60, along with fuel 62 to form a fuel/air mixture stream 63. The fuel/air mixture stream 63 is then introduced into a catalyst section 60, wherein a catalyst may be located and partially oxidizes the fuel by contacting the catalyst mixture with an oxidation catalyst in a catalytic oxidation stage. The catalyst may be any catalyst known within the art. By way of example, the catalyst may be platinum, rhodium, iridium, ruthenium, palladium, chromium oxides, cobalt oxides, alumina and mixtures thereof. This process generates a heat of reaction and a partial oxidation product stream comprising partially oxidized hydrocarbons, carbon monoxide and excess air. The temperature and composition of the partial oxidation product stream are selected to control simultaneously the amounts of $NO_x$ formed in the combustor 62 and the stability of the flame in the combustor 62, thereby controlling the total amount of $NO_x$ in the effluent gas stream 64. According to one embodiment the temperature may be set to yield a flame temperature of around 1700 K. The secondary air stream 70 cools the effluent gas stream. The effluent gas stream 64, output bypass flow stream 66 and secondary air stream 70 combine to form the exit effluent gas stream 68 upstream from the turbine.

In another aspect of the present invention, a method of combusting a hydrocarbon fuel is disclosed. Air may be compressed, forced to flow over the compressor walls to provide convective cooling, then divided into at least one air staging valve air stream and at least one secondary air stream. The air staging valve air stream may be controllably divided into at least one bypass flow stream, and at least one primary air stream. According to an embodiment the air may be controllably divided through the use of an air staging valve. The position of the air staging valve dictates which direction the air will flow. The bypass flow stream combines with the secondary air stream to form an exit effluent air stream into the turbine. The air staging valves are designed so that, as the bypass flow stream is reduced so the primary air stream is increased, maintaining the effective area of the system roughly constant. In this way, the pressure drop of the system is kept essentially constant with no consequent impact on engine efficiency. The main combustion air stream may be introduced into a fuel preparation section, wherein main fuel is injected and mixed to form a catalyst mixture. The catalyst mixture may be introduced into a catalyst section, wherein a catalyst is located and partially oxidizes the fuel by contacting the catalyst mixture with an oxidation catalyst in a catalytic oxidation stage. The catalyst may be any catalyst known within the art. By way of example, the catalyst may be platinum, rhodium, iridium, ruthenium, palladium, chromium oxides, cobalt oxides, alumina and mixtures thereof. This generates a heat of reaction and a partial oxidation product stream comprising partially oxidized hydrocarbons, carbon monoxide and excess air. The partial oxidation product stream is then combusted in a main combustor, at a condition at which appreciable quantities of thermal $NO_x$ are not formed. The temperature and composition of the partial oxidation product stream are selected to control simultaneously the amounts of $NO_x$ formed in the main combustor and the stability of the flame in the main combustor, thereby controlling the total amount of $NO_x$ in the exit effluent gas stream. By way of example, the air staging valve may be set to yield a flame temperature of around 1700 K. Typically this will result in ultra-low emissions on the order of less than 5 ppm. Combining the effluent gas stream generated and the control air stream create the exit effluent gas stream. This exit effluent gas stream may be then delivered to a turbine.

Figure 4:
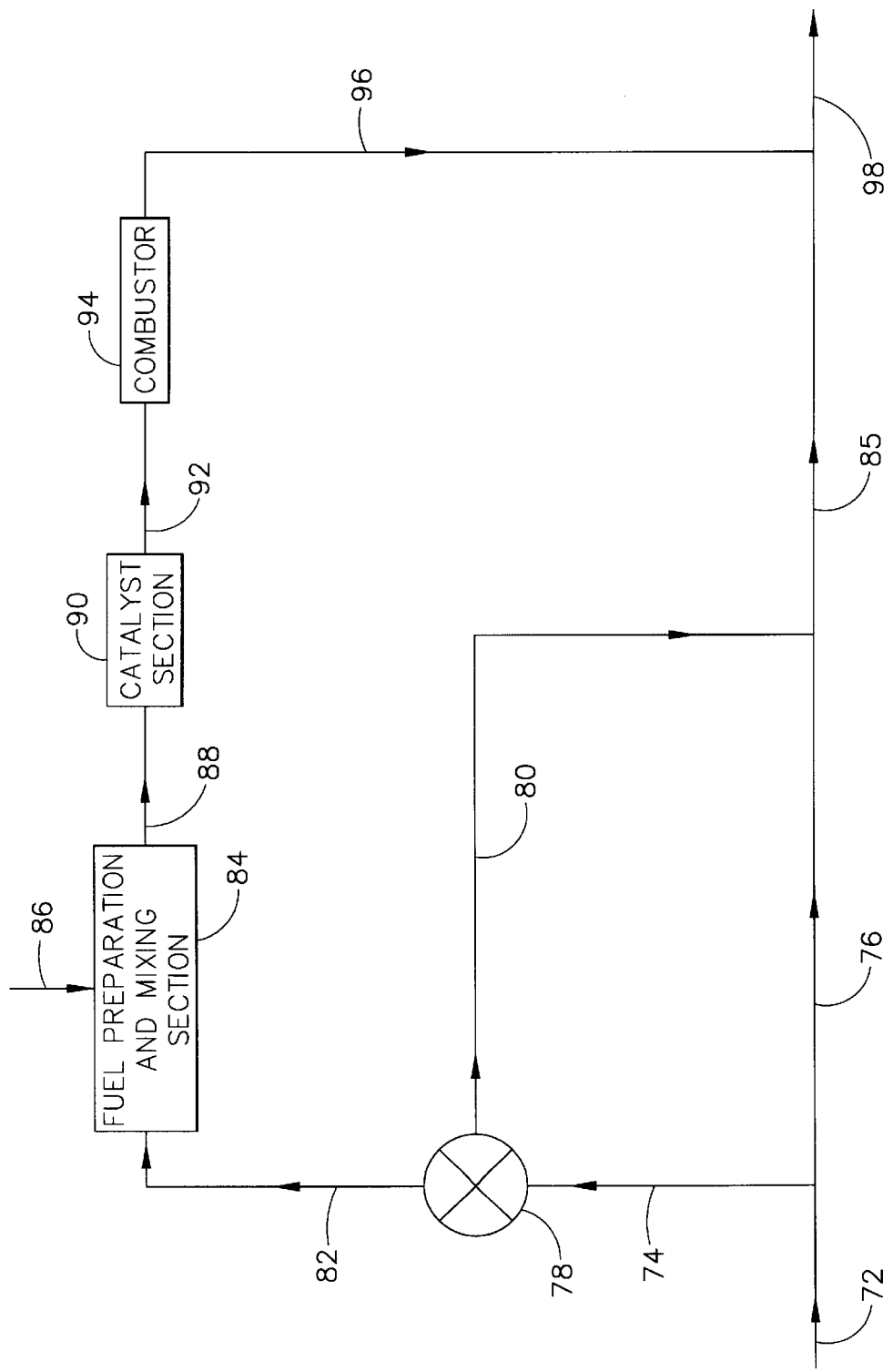
FIG. 4 is a system diagram of the hybrid lean premixing catalytic combustion system for gas turbine according to the present invention.

FIG. 4 depicts a system diagram of the hybrid lean premixing catalytic combustion system for gas turbine according to the present invention. As shown an air stream 72 may be divided into an air staging valve air stream 74 and a secondary air stream 76. The air staging valve air stream 74 may be controllably divided by an air staging valve 78 into a primary air stream 82 and a bypass flow stream 80. The primary air stream 82 may be led into a fuel preparation and mixing section 84, where fuel 86 may be injected, the primary air stream 82 and fuel 86 may be mixed and the result may be a fuel/air mixture stream 88. The fuel/air mixture stream may be led to the catalyst section 90, wherein a catalyst is housed. The fuel/air mixture stream may be oxidized and the resulting product stream may be the partial oxidation stream 92. The temperature and composition of the partial oxidation stream 92 may be selected to control simultaneously the amounts of $NO_x$ formed in the main combustor and the stability of the flame in the main combustor, thereby controlling the total amount of $NO_x$ in the exit effluent gas stream The partial oxidation stream 92 may then be combusted within the combustor 94, resulting in an effluent gas stream 96. The combination of the bypass flow stream 80 and the secondary air stream 76 may result in a control air stream 85 which may be joined with the effluent gas stream 96 to form an exit effluent gas stream 98. It is envisioned that the bypass flow stream may be directly injected into the effluent gas stream without first being combined with the secondary air stream. The secondary air stream may act as the control air stream.

Figure 5:
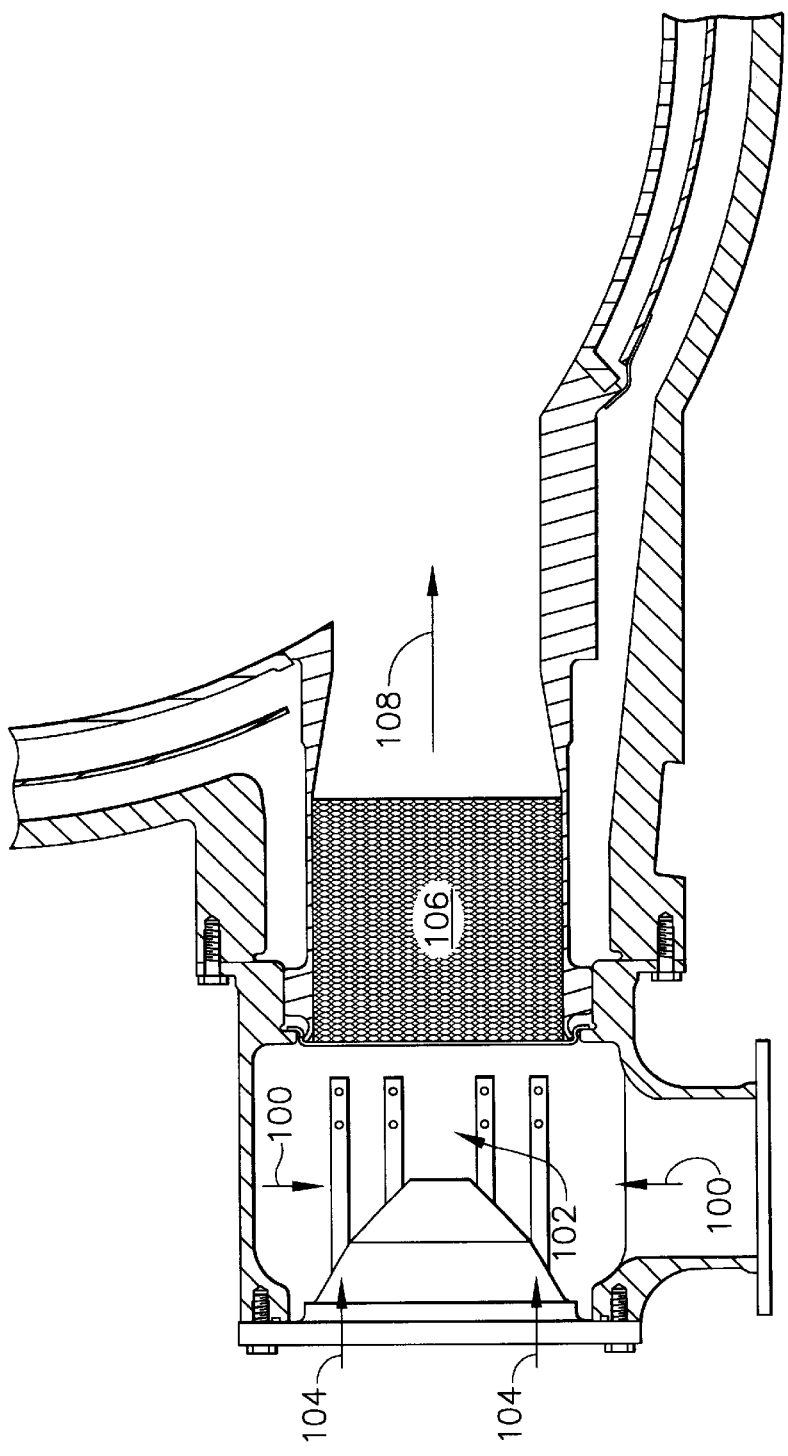
FIG. 5 is a cross-sectional view of the incorporation of a catalyst section into a combustion system.

FIG. 5 depicts a cross sectional view of an embodiment of the incorporation of the catalyst into a hybrid lean premixing catalytic combustion system for gas turbines as disclosed in the present invention. As shown, air enters from the air staging valves 100 and fuel is injected 104 into the fuel preparation and mixing region 102. Thereafter the fuel and air mixture passes to the catalyst section 106, wherein at least one catalyst may be positioned, and a partial oxidation stream 108 results. The partial oxidation stream 108 is then led to the combustor. Because a partial oxidation reaction takes place within the catalyst module it is necessary to maintain a high enough gas velocity in the area where the catalyst exits to prevent flame flashback into the catalyst exit duct. Also, the duct should be sized to eliminate the risk of auto-ignition at high pressure especially on liquid fuels.

For starting and low power operation, when the compressor outlet air temperature may be insufficient to activate the catalyst, the system will be operated in Lean Premixed (LP) Mode. The fuel/air mixture will be fed through the catalyst section to the combustor where the flame stabilizes as normal. While oxidation may not occur in the catalyst section premixing of the fuel/air mixture will be enhanced by the presence of the catalyst. Under these conditions the air staging valve schedule will be set to yield a flame temperature of around 1800 K in order to achieve the best low emission typical of conventional LP operation.

As the engine power level increase the compressor outlet air temperature will become high enough to activate the catalyst. Once the catalyst is active, the partial oxidation reactions within the catalyst module will produce active radicals and heating of the fuel/air mixture leaving the catalyst modules. This will enhance flame stability, allowing the flame stabilized in the combustor to be leaned out compared to LP mode, without compromising carbon monoxide and hydrocarbon emissions. This additional leaning of the flame will further reduce $NO_x$ emissions relative to LP operation. Under these conditions the air staging valve schedule will be set to yield a flame temperature of around 1700 K in order to achieve the best low emissions typical of catalyst operation.

In one aspect of the present invention, a method of combusting a hydrocarbon fuel is disclosed. According to this method, and with reference to FIG. 4 air may be compressed, then divided into at least one air staging valve air stream 74 and at least one secondary air stream 76. Each air staging valve air stream may be divided into at least one bypass flow stream 80, and at least one primary air stream 82. The bypass flow stream 80 flows through a bypass manifold, combines with the secondary air stream 76 and the output may be a control air stream 85. As mentioned previously it is also envisioned that alternatively, and not depicted, the bypass flow stream may be directly injected into the effluent gas stream without being combined with the secondary air stream. The primary air stream 82 is introduced into a fuel preparation and mixing section 84, wherein fuel 86 may be injected and mixed to form a fuel/air mixture stream 88, which may be introduced into a catalyst section 90. Within the catalyst section 90 the partial oxidation reactions will produce active radicals and heating of the fuel/air mixture stream to form a partial oxidation stream 92 leaving the catalyst section 90. This will enhance flame stability, allowing the flame stabilized in the combustor to be leaned out compared to LP mode, without compromising carbon monoxide and hydrocarbon emissions. The temperature and composition of the partial oxidation product stream 92 are selected to control simultaneously the amounts of $NO_x$ formed in the main combustor and the stability of the flame in the main combustor, thereby controlling the total amount of $NO_x$ in the exit effluent gas stream 98. The partial oxidation stream 92 will then pass to the combustor 94, wherein the partial oxidation stream 92 may be combusted and an effluent gas stream 96 produced. According to this embodiment, the effluent gas stream 96 combines with the bypass flow stream 80 and secondary air streams 84 to form an exit effluent gas stream 98, which exits to the turbine.

It should be understood, of course, that the foregoing relates to preferred embodiments of the invention and that modifications may be made without departing from the spirit and scope of the invention as set forth in the following claims.

I claim:

1. A method of combusting hydrocarbon fuel, comprising:

compressing an air stream in a compressor;

dividing the air stream into at least one air staging valve air stream and at least one secondary air stream;

controllably dividing said air staging valve air stream into at least one bypass flow stream, and at least one primary air stream;

introducing said bypass flow stream into a bypass manifold, wherein the output is an output bypass flow stream;

introducing said primary air stream into a fuel preparation and mixing section, wherein fuel is injected and mixed to form a fuel/air mixture stream;

introducing said fuel/air mixture stream into a catalyst section, wherein a catalyst is located, thereby generating a heat of reaction and a product stream of partially oxidized hydrocarbons, carbon monoxide and excess air;

combusting said product stream, in a main combustor, at a condition at which appreciable quantities of thermal $NO_x$ are not formed, thereby generating an effluent gas stream; and combining said effluent gas stream with said output bypass flow stream and secondary air stream to form an exit effluent gas stream, wherein the temperature and composition of the product stream are selected to control simultaneously the amounts of $NO_x$ formed in the main combustor and the stability of the flame in the main combustor, thereby controlling the total amount of $NO_x$ in the exit effluent gas stream.

2. A method as in claim 1, further comprising a valve for controllably dividing said air staging valve air stream.

3. A method as in claim 1, wherein the step of controllably dividing said air staging valve air stream into at least one bypass flow stream, and at least one primary air stream is accomplished by controlling the air valve schedules through a predetermined schedule.

4. A method as in claim 1, wherein the temperature and composition of said product stream are selected to control simultaneously the amount of thermal $NO_x$ and prompt $NO_x$ formed in the main combustor.

5. A method as in claim 1, wherein said catalyst is selected from the group consisting of platinum, rhodium, iridium, ruthenium, palladium, chromium oxides, cobalt oxides, alumina and mixtures thereof.

6. A method as in claim 1, wherein said fuel is in liquid form.

7. A method as in claim 1, wherein said fuel is in gaseous form.

8. A method as in claim 1, further comprising the step of delivering said exit effluent gas stream to a turbine.

9. A method of combusting hydrocarbon fuel, comprising:

compressing an air stream in a compressor;

dividing the air stream into at least one air staging valve air stream and at least one secondary air stream;

controllably dividing said air staging valve air stream into at least one bypass flow stream, and at least one primary air stream;

introducing said bypass flow stream into a bypass manifold;

introducing said primary air stream into a fuel preparation and mixing section, wherein fuel is injected and mixed to form a fuel/air mixture stream;

introducing said fuel/air mixture stream into a catalyst section, wherein a catalyst is located and partially oxidizes the fuel by contacting the fuel/air mixture with an oxidation catalyst in a catalytic oxidation stage, thereby generating a heat of reaction and a partial oxidation product stream comprising partially oxidized hydrocarbons, carbon monoxide and excess air;

combusting the partial oxidation product stream, in a main combustor, at a condition at which appreciable quantities of thermal $NO_x$ are not formed, thereby generating an effluent gas stream; and combining said effluent gas stream with said bypass flow stream and secondary air streams to form an exit effluent gas stream, wherein the temperature and composition of the partial oxidation product stream are selected to control simultaneously the amounts of $NO_x$ formed in the main combustor and the stability of the flame in the main combustor, thereby controlling the total amount of $NO_x$ in the exit effluent gas stream.

10. A method as in claim 9, further comprising a valve for controllably dividing said air staging valve air stream.

11. A method as in claim 9, wherein the step of controllably dividing said air staging valve air stream into at least one bypass flow stream, and at least one primary air stream is accomplished by controlling the air valve schedules through a predetermined schedule.

12. A method as in claim 9, wherein the temperature and composition of the partial oxidation product stream are selected to control simultaneously the amount of thermal $NO_x$ and prompt $NO_x$ formed in the main combustor.

13. A method as in claim 9, wherein said catalyst is selected from the group consisting of platinum, rhodium, iridium, ruthenium, palladium, chromium oxides, cobalt oxides, alumina and mixtures thereof.

14. A method as in claim 9, wherein said fuel is in liquid form.

15. A method as in claim 9, wherein said fuel is in gaseous form.

16. A method as in claim 9, further comprising the step of delivering said exit effluent gas stream to a turbine.

17. A method of combusting hydrocarbon fuel, comprising:

compressing an air stream in a compressor;

dividing the air stream into a first air staging valve air stream, a second air staging valve air stream and one secondary air stream;

utilizing an air staging valve to controllably divide said first air staging valve air stream into one bypass flow stream and one primary air stream;

introducing said bypass flow stream into a bypass manifold, wherein the output is an output bypass flow stream;

introducing said primary air stream into a fuel preparation and mixing section, wherein fuel is injected and mixed to form a fuel/air mixture stream;

introducing said fuel/air mixture stream into a catalyst section, wherein a catalyst is located and partially oxidizes the fuel by contacting the catalyst mixture with an oxidation catalyst in a catalytic oxidation stage, thereby generating a heat of reaction and a partial oxidation product stream comprising partially oxidized hydrocarbons, carbon monoxide and excess air;

combusting the partial oxidation product stream, in a main combustor, at a condition at which appreciable quantities of thermal $NO_x$ are not formed, thereby generating an effluent gas stream; and combining said effluent gas stream with said output bypass flow stream, and said secondary air stream to form an exit effluent gas stream, wherein the temperature and composition of the partial oxidation product stream are selected to control simultaneously the amounts of $NO_x$ formed in the main combustor and the stability of the flame in the main combustor, thereby controlling the total amount of $NO_x$ in the exit effluent gas stream.

18. A method as in claim 17, wherein the temperature and composition of the partial oxidation product stream are selected to control simultaneously the amount of thermal $NO_x$ and prompt $NO_x$ formed in the main combustor.

19. A method as in claim 17, wherein said catalyst is selected from the group consisting of platinum, rhodium, iridium, ruthenium, palladium, chromium oxides, cobalt oxides, alumina and mixtures thereof.

20. A method as in claim 17, wherein said fuel is in liquid form.

21. A method as in claim 17, wherein said fuel is in gaseous form.

22. A method as in claim 17, wherein said step of controllably dividing said air staging valve air stream into at least one bypass flow stream, and at least one primary air stream is accomplished by controlling the air valve schedules through a predetermined schedule.

23. A method as in claim 17, further comprising the step of delivering said exit effluent gas stream to a turbine.

24. A method of combusting hydrocarbon fuel, comprising:

compressing an air stream in a compressor;

dividing the air stream into a first air staging valve air stream, a second air staging valve air stream and one secondary air stream;

utilizing an air staging valve to controllably divide said first air staging valve air stream into one bypass flow stream and one primary air stream;

introducing said bypass flow stream into a bypass manifold, wherein the output is an output bypass flow stream;

introducing said primary air stream into a fuel preparation and mixing section, wherein fuel is injected and mixed to form a fuel/air mixture stream;

introducing said fuel/air mixture stream into a catalyst section, wherein a catalyst is introduced and partially oxidizes the fuel by contacting the catalyst mixture with an oxidation catalyst in a catalytic oxidation stage, thereby generating a heat of reaction and a partial oxidation product stream comprising hydrocarbons, carbon monoxide and excess air;

combusting the partial oxidation product stream, in a main combustor, at a condition at which appreciable quantities of thermal $NO_x$ are not formed, thereby generating an effluent gas stream;

controlling the flame in the main combustor to a flame temperature between 1700 and 2000 K by varying the position of said air staging valve;

combining said effluent gas stream with said bypass air stream, and said secondary air stream to form an exit effluent gas stream, wherein the temperature and composition of the partial oxidation product stream are selected to control simultaneously the amounts of $NO_x$ formed in the main combustor and the stability of the flame in the main combustor, thereby controlling the total amount of $NO_x$ in the exit effluent gas stream.

25. A method as in claim 24, wherein the temperature and composition of the partial oxidation product stream are selected to control simultaneously the amount of thermal $NO_x$ and prompt $NO_x$ formed in the main combustor.

26. A method as in claim 24, wherein said catalyst is selected from the group consisting of platinum, rhodium, iridium, ruthenium, palladium, chromium oxides, cobalt oxides, alumina and mixtures thereof.

27. A method as in claim 24, wherein said fuel is in liquid form.

28. A method as in claim 24, wherein said fuel is in gaseous form.

29. A method as in claim 24, further comprising the step of delivering said exit effluent gas stream to a turbine.

* * * * *